United States Patent

Pest

[15] 3,649,769

[45] Mar. 14, 1972

[54] CIRCUIT FOR SUPPLYING DIRECT CURRENT TO A TELEPHONE LINE

[72] Inventor: Jurgen Pest, Lynchburg, Va.

[73] Assignee: General Electric Company

[22] Filed: Oct. 28, 1970

[21] Appl. No.: 84,747

[52] U.S. Cl. ..................................179/77, 307/255, 307/313

[51] Int. Cl. ..................................H04m 19/08

[58] Field of Search ..................................179/77, 23, 81 R; 307/288

[56] References Cited

FOREIGN PATENTS OR APPLICATIONS 125,817 0/1959 U.S.S.R. ..................................179/77

*Primary Examiner*—Kathleen H. Claffy
*Assistant Examiner*—Horst F. Brauner
*Attorney*—James J. Williams, Frank L. Neuhauser, Oscar B. Waddell and Joseph B. Forman

[57] ABSTRACT

Two PNP transistors are coupled between the positive pole of a direct current source and one side of a telephone line, and two NPN transistors are coupled between the negative pole of the direct current source and the other side of the telephone line. The transistors are provided with circuits to control the direct current supplied to the telephone line. The transistors present a high impedance to voice frequency and alternating current signals on the telephone line, and thus provide the desired current without large inductors.

2 Claims, 1 Drawing Figure

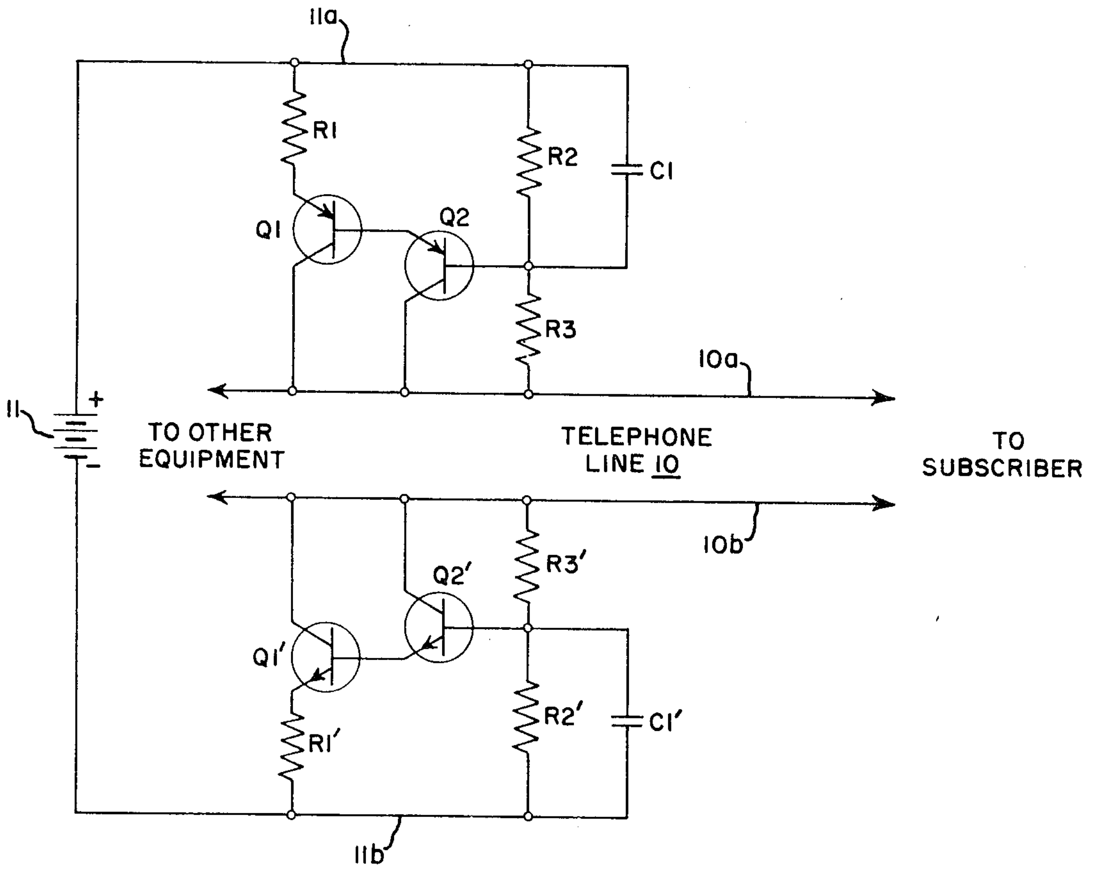
INVENTOR:
JURGEN PEST,
BY James J. Williams
HIS ATTORNEY.

CIRCUIT FOR SUPPLYING DIRECT CURRENT TO A TELEPHONE LINE

BACKGROUND OF THE INVENTION

My invention relates to an improved circuit for supplying direct current to a telephone line, and particularly to such a circuit that presents a relatively high impedance to voice frequency and alternating current signals on the line without using inductors.

Telephone lines require direct current for many applications, such as dialing and other types of signalling. Generally, both sides of a telephone line should be or preferably are balanced; that is, both sides of the telephone line should have the same, relatively high voice frequency or alternating current impedance to ground. Previously, where direct current is needed on the telephone line for some reason, this direct current has been supplied through inductors. Such inductors are, of course, relatively large, relatively expensive to manufacture, and relatively difficult or impossible to vary or adjust once they are manufactured and installed.

Accordingly, an object of my invention is to provide a novel circuit for supplying direct current to telephone lines that eliminates many of the disadvantages of inductors.

Another object of my invention is to provide a new and improved circuit for supplying direct current to telephone lines that has a relatively high voice frequency impedance but that does not require inductors.

Another object of my invention is to provide a new, relatively compact, and relatively reliable noninductive direct current supply circuit for telephone lines.

SUMMARY OF THE INVENTION

Briefly, these and other objects are achieved in accordance with my invention by a first circuit connected between the positive pole of a direct current source and one side of a telephone line, and by a second circuit connected between the negative pole of the direct current source and the other side of the telephone line. The first circuit has two PNP transistors with their collectors connected to the one side of the telephone line and biased to supply the desired direct current. The second circuit has two NPN transistors with their collectors connected to the other side of the telephone line and also biased to pass the same desired direct current. The transistor collectors present the desired high impedance to the telephone line, and also provide direct current in a relatively compact and reliable circuit.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which: The single FIGURE shows a preferred circuit diagram of a circuit in accordance with my invention for supplying direct current to a telephone line.

DESCRIPTION OF THE PREFERRED EMBODIMENT

In the figure, I have shown a telephone line 10 having two sides or wires 10*a*, *b*. As an example, the wires 10*a*, 10*b* can extend between central office equipment (for connection to a subscriber at one end), and other equipment, such as an amplifier (for connection to a subscriber at the other end). As mentioned above, it is frequently necessary that direct current be supplied to the telephone line 10 to provide some function, such as dialing, signalling, or some other operation. At the same time, it is desired that the telephone line 10 be balanced to ground. That is, both sides or wires 10*a*, 10*b* should have an alternating current or voice frequency impedance that is the same and that is high relative to ground. Since many direct current sources, particularly in a telephone central office, are grounded, it is necessary that voice frequency signals or alternating current signals see a high impedance at the point where the direct current is connected to the telephone line. Previously, this high impedance has been provided by the use of inductors which may be in the order of several henries in order to present the necessary impedance to the relatively low voice frequency signals. In addition to being relatively large in size, these inductors must have the necessary current-carrying capacity so as to minimize heat and power loss.

The circuit shown in the figure provides a new and improved circuit for supplying direct current to the telephone line 10 without the use of inductors. In the figure, the source of direct current is represented by a battery 11 whose positive pole is connected to a positive terminal or bus 11a, and whose negative pole is connected to a negative terminal or bus 11*b*. A first circuit is connected between the positive bus 11*a* and one side 10a of the line 10. This circuit comprises two PNP-type transistors Q1, Q2. The collector of the transistor Q1 is connected to the one side 10*a*, and the emitter of the transistor Q1 is connected through a current-limiting resistor R1 to the positive bus 11*a*. The second transistor Q2 also has its collector connected to the one side 10*a*, but its emitter is connected to the base of the first transistor Q1. A voltage-dividing network comprising two serially connected biasing resistors R2, R3 is connected between the positive bus 11*a* and the one side 10*a*. The junction of the biasing resistors R2, R3 is connected to the base of the transistor Q2. The resistors R2, R3 are given magnitudes so that the transistor Q2 conducts a selected current. This conduction of current through the transistor Q2 causes the transistor Q1 to conduct the desired current for supplying this current from the bus 11a, through the resistor R1, and through the emitter-collector path of the transistor Q1 to the one side 10a of the line 10. A capacitor C1 is connected between the base of the transistor Q2 and the positive bus 11a in order to ground the base of the transistor Q2 with respect to alternating current so that the collectors of the transistors Q1, Q2 will present the desired high impedance to alternating current signals.

On the other side 10*b* of the line 10, a second circuit is connected between the negative bus 11*b* and the other side 10*b*. This second circuit utilizes two NPN-type transistors Q1′, Q2′, and has circuit components and connections that are similar in magnitude and function to the components and connections in the first circuit. The similarity is indicated by using reference numerals for this second circuit that are the same as the first circuit but that are followed by a prime mark. Thus, for example, the resistor R1′ is similar in magnitude and function to the resistor R1, and is connected between the emitter of the transistor Q1′ and the negative bus 11*b*. The other circuit elements, namely the resistors R2′, R3′ and the capacitor C1′ are connected in similar fashion. In addition to corresponding circuit elements having the same magnitude, the transistor Q1′ has substantially the same beta (current amplification factor) as the transistor Q1, and the transistor Q2′ has substantially the same beta as the transistor Q2. Thus, the bias resistors R2′, R3′ provide the same current flow through the transistor Q1′ as is provided through the transistor Q1.

When the circuit is in operation, current flows from the positive bus 11a through the resistor R1 and the transistor Q1 to one side 10*a* of the telephone line 10; through whatever circuit elements or apparatus is provided on the line 10; and from the other side 10*b* of the line 10 through the transistor Q1′ and the resistor R1′ back to the negative bus 11*b*. The circuit provides a high impedance to voice frequency or alternating current signals on the line 10 because the collectors (with their corresponding high impedance) of all of the transistors Q1, Q1′, Q2, Q2′ are connected to the telephone line 10. And, this desired high impedance is provided with a circuit that is relatively small and reliable, but that does not require relatively large and expensive inductors.

Utilizing the circuit shown in the figure, I constructed an embodiment for a telephone line having a characteristic impedance of 900 ohms and up to 1,900 ohms of total direct current resistance. The circuit supplied between 25 and 100 milliamperes of direct current from an office battery having a nominal potential of 48 volts. The circuit components had the following values:

| | |
|---|---|
| Transistor Q1 | Similar to Type 2N2800 |
| Transistor Q2 | Similar to Type 2N2800 |
| Transistor Q1' | Similar to Type 2N3053 |
| Transistor Q2' | Similar to Type 2N3053 |
| Resistors R1, R1' | 180 ohms |
| Resistors R2, R2' | 82,000 ohms |
| Resistors R3, R3' | 15,000 ohms |
| Capacitors C1, C1' | 4 microfarads |

The circuit presented approximately 15,000 ohms impedance to voice frequency signals on each side of the telephone line.

It will thus be seen that my invention provides a new and improved circuit for supplying direct current to a telephone line without the use of inductors. While I have shown and described only one circuit and one set of values, persons skilled in the art will appreciate that other circuit component values may be used, depending upon the exact operating parameters and conditions. Therefore, it is to be understood that modifications may be made without departing from the spirit of my invention or from the scope of the claims.

What I claim as new and desire to secure by Letters Patent of the United States is:

1. An improved circuit for supplying direct current to a telephone line that carries voice frequency or alternating current signals comprising:

a. a positive terminal and a negative terminal for respective connection to the positive pole and the negative pole of a source of direct current;

b. a first terminal and a second terminal for respective connection to the two sides of a telephone line;

c. first and second PNP-type transistors each having an emitter, a base, and a collector;

d. first and second NPN-type transistors each having an emitter, a base, and a collector;

e. first and second current-limiting resistors of substantially equal magnitude;

f. first and second bias resistors of substantially equal magnitude;

g. third and fourth bias resistors of substantially equal magnitude;

h. first and second capacitors of substantially equal magnitude;

i. means connecting said collector of said first PNP transistor to said first terminal;

j. means connecting said first current-limiting resistor between said emitter of said first PNP transistor and said positive terminal;

k. means connecting said collector of said second PNP transistor to said first terminal;

l. means connecting said emitter of said second PNP transistor to said base of said first PNP transistor;

m. means connecting said first and third bias resistors in series between said positive terminal and said first terminal;

n. means connecting the junction of said first and third bias resistors to said base of said second PNP transistor;

o. means connecting said first capacitor between said base of said second PNP transistor and said positive terminal;

p. means connecting said collector of said first NPN transistor to said second terminal;

q. means connecting said second current-limiting resistor between said emitter of said first NPN transistor and said negative terminal;

r. means connecting said collector of said second NPN transistor to said second terminal;

s. means connecting said emitter of said second NPN transistor to the base of said first NPN transistor;

t. means connecting said second and fourth bias resistors in series between said negative terminal and said second terminal;

u. means connecting the junction of said second and fourth bias resistors to said base of said second NPN transistor;

v. and means connecting said second capacitor between said base of said second NPN transistor and said negative terminal.

2. The improved circuit of claim 1 wherein the beta of said first PNP transistor is substantially equal to the beta of said first NPN transistor, and wherein the beta of said second PNP transistor is substantially equal to the beta of said second NPN transistor.

* * * * *